(12) United States Patent
Lacher et al.

(10) Patent No.: US 9,382,925 B2
(45) Date of Patent: Jul. 5, 2016

(54) AUTOMATED SHIFTING OF HYDRAULIC DRIVE SYSTEMS

(75) Inventors: Patrick P. Lacher, Bismarck, ND (US);
Daniel J. Krieger, Bismarck, ND (US);
Gunter G. Matt, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 345 days.

(21) Appl. No.: 13/805,759

(22) PCT Filed: Mar. 2, 2012

(86) PCT No.: PCT/US2012/027513
§ 371 (c)(1),
(2), (4) Date: Feb. 14, 2013

(87) PCT Pub. No.: WO2012/119089
PCT Pub. Date: Sep. 7, 2012

(65) Prior Publication Data
US 2013/0133319 A1    May 30, 2013

Related U.S. Application Data

(60) Provisional application No. 61/448,940, filed on Mar. 3, 2011.

(51) Int. Cl.
*F15B 13/00* (2006.01)
*E02F 9/22* (2006.01)
*F16H 61/421* (2010.01)

(52) U.S. Cl.
CPC ............... *F15B 13/00* (2013.01); *E02F 9/2253* (2013.01); *E02F 9/2296* (2013.01); *F16H 61/421* (2013.01)

(58) Field of Classification Search
CPC ..... F16H 61/421; E02F 9/2296; E02F 9/2253

USPC ........................................... 60/445, 465, 490
See application file for complete search history.

(56) References Cited

U.S. PATENT DOCUMENTS

| 4,148,231 A | 4/1979 | Redzinski |
|---|---|---|
| 4,261,431 A | 4/1981 | Hawbaker |

(Continued)

FOREIGN PATENT DOCUMENTS

| CN | 101680463 A | 3/2010 |
|---|---|---|
| CN | 101914932 A | 12/2010 |

(Continued)

OTHER PUBLICATIONS

Search Report and Written Opinion dated May 31, 2012 for International Application No. PCT/US2012/027513, filed Mar. 2, 2012, 10 pages.

(Continued)

*Primary Examiner* — Thomas E Lazo
(74) *Attorney, Agent, or Firm* — John D. Veldhuis-Kroeze; Westman, Champlin & Koehler, P.A.

(57) ABSTRACT

A drive system for propelling a power machine over a support surface is disclosed. The drive system includes a hydraulic pressure source and a drive assembly. The drive assembly has a hydraulic motor in fluid communication with the hydraulic pressure source that is switchable between first and second displacement arrangements. A shift valve receives pressurized fluid from the hydraulic pressure source and provides a shift signal to the hydraulic motor to selectively cause the displacement of the hydraulic motor to shift between the first and second displacement arrangements. A sensing device capable of generating a load signal indicative of a load condition provided by the drive assembly is also provided. An electronic controller provides a control signal to the shift valve to control the displacement of the hydraulic motor in response at least in part due to the load signal.

19 Claims, 15 Drawing Sheets

(56) References Cited

U.S. PATENT DOCUMENTS

| | | | |
|---|---|---|---|
| 5,085,052 A * | 2/1992 | Kawanaka et al. | 60/445 |
| 5,875,630 A | 3/1999 | Walsh et al. | |
| 6,202,014 B1 | 3/2001 | Brandt et al. | |
| 6,385,519 B2 | 5/2002 | Rocke | |
| 6,609,368 B2 | 8/2003 | Dvorak et al. | |
| 6,725,105 B2 | 4/2004 | Francis et al. | |
| 6,785,596 B2 | 8/2004 | Brandt et al. | |
| 6,920,384 B2 | 7/2005 | Shiimado et al. | |
| 6,938,719 B2 * | 9/2005 | Ishimaru et al. | 180/305 |
| 6,941,688 B2 * | 9/2005 | Ichimura et al. | 37/348 |
| 7,142,967 B2 | 11/2006 | Brandt et al. | |
| 7,290,390 B2 * | 11/2007 | Kim | 60/445 |
| 7,390,282 B2 | 6/2008 | Shah | |
| 7,398,648 B2 * | 7/2008 | Tatsuno et al. | 60/448 |
| 7,496,441 B2 | 2/2009 | Brandt et al. | |
| 7,539,571 B2 | 5/2009 | Strosser et al. | |
| 7,894,961 B2 | 2/2011 | Blackburn et al. | |
| 7,894,963 B2 | 2/2011 | Shenoy et al. | |
| 8,312,716 B2 * | 11/2012 | Deeken et al. | 60/490 |
| 2009/0126361 A1 * | 5/2009 | Kakizawa et al. | 60/445 |
| 2010/0097040 A1 | 4/2010 | Boisvert et al. | |

FOREIGN PATENT DOCUMENTS

| | | | |
|---|---|---|---|
| EP | 0445829 A2 | 9/1991 | |
| EP | 1008785 A2 * | 6/2000 | F16H 61/46 |
| JP | 2000017692 A | 1/2000 | |
| JP | 2004340259 A * | 12/2004 | F15B 11/02 |

OTHER PUBLICATIONS

Chinese Office Action and English Translation dated Jan. 27, 2015 for Chinese Application No. 201280001879.0, 30 pages.
Chinese Office Action and English Translation dated Dec. 3, 2015 for Chinese Application No. 201280001879.0, 10 pages.

* cited by examiner

AUTOMATED SHIFTING OF HYDRAULIC DRIVE SYSTEMS

CROSS-REFERENCE TO RELATED APPLICATION

This Application is a Section 371 National Stage Application of International Application No. PCT/US2012/027513, filed Mar. 2, 2012 and published as WO2012/119089 on Sep. 9, 2012.

BACKGROUND

The current disclosure is related to power machines. More particularly, the current disclosure is related to drive systems for power machines. Many power machines such as excavators, wheel loaders including skid steer loaders and steerable axle loaders, tracked loaders and the like incorporate hydraulic or hydrostatic drive systems to propel the power machine over a support surface. One component in many of these types of machines is a drive motor, which receives power in the form of pressurized hydraulic fluid from a power source and converts the power into rotational motion to drive one or more wheels, tracks or other similar devices to cause the power machine to move over the support surface. For a given pressure and flow rate, motors with a relatively high displacement deliver higher torque but at a lower speed than motors with relatively lower displacement.

In certain situations, power machines that employ a higher displacement motor are more advantageous than similar power machines that have a lower displacement motor. For example, when a power machine is engaging ground such as in a digging or grading application, ascending an incline, or negotiating a turn, a higher torque motor is more advantageous than a lower torque motor. Conversely, a high-speed motor is more advantageous in some situations. For example, when an operator wishes to move the power machine from one location to another on a generally flat surface, a lower torque motor that achieves higher travel speed is more advantageous.

Some hydraulic motors have the capability to shift from a high displacement arrangement to a low displacement arrangement in response to an operator input. However, there may be instances when an operator selects the low displacement arrangement but then operates the power machine in a way that causes a high load condition on the power machine. In such situations, a hydraulic motor on the power machine may be overloaded and stall, causing the operator to shift from a low displacement arrangement to a high displacement arrangement. Alternatively, an operator may reduce travel inputs to reduce the travel signals provided to a hydraulic pump and avoid a stalling condition, but even an experienced operator will find it extremely difficult, if not impossible, to maximize the effort of such a power machine and avoid a stalling condition.

The discussion above is merely provided for general background information and is not intended to be used as an aid in determining the scope of the claimed subject matter.

SUMMARY

In one illustrative embodiment, a power machine having a drive system for propelling the power machine over a support surface is disclosed. The drive system includes a hydraulic pressure source with at least one hydraulic pump that provides pressurized fluid as an output. The power machine also includes a drive assembly with a hydraulic motor, a drive control valve, a shift valve and a sensing device. The hydraulic motor is in fluid communication with the hydraulic pressure source and is switchable between a first displacement arrangement and a second displacement arrangement. The first displacement arrangement has a larger displacement than the second displacement arrangement. A drive control valve is operably coupled to the hydraulic pressure source and the hydraulic motor. The drive control valve is configured to provide pressurized fluid from the hydraulic pressure source to the hydraulic motor to cause the hydraulic motor to rotate. The shift valve is operably coupled to the hydraulic pressure source and receives pressurized fluid from the hydraulic pressure source. The shift valve provides a shift signal to the hydraulic motor assembly to selectively cause the displacement of the hydraulic motor to shift between the first displacement arrangement and the second displacement arrangement. The sensing device generates a load signal indicative of a load condition provided by the drive assembly. The power machine also includes an electronic controller. The electronic controller is operably coupled to the sensing device and the shift valve to provide a control signal to the shift valve to control the displacement of the hydraulic motor in response at least in part due to the load signal.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Before any embodiments are explained in detail, it is to be understood that the embodiments described herein are not limited in its application to the details of construction and the arrangement of components set forth in the following description or illustrated in the following drawings. Further, it is to be understood that the phraseology and terminology used herein is for the purpose of description and should not be regarded as limiting. The use of words such as "including," "comprising," and "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
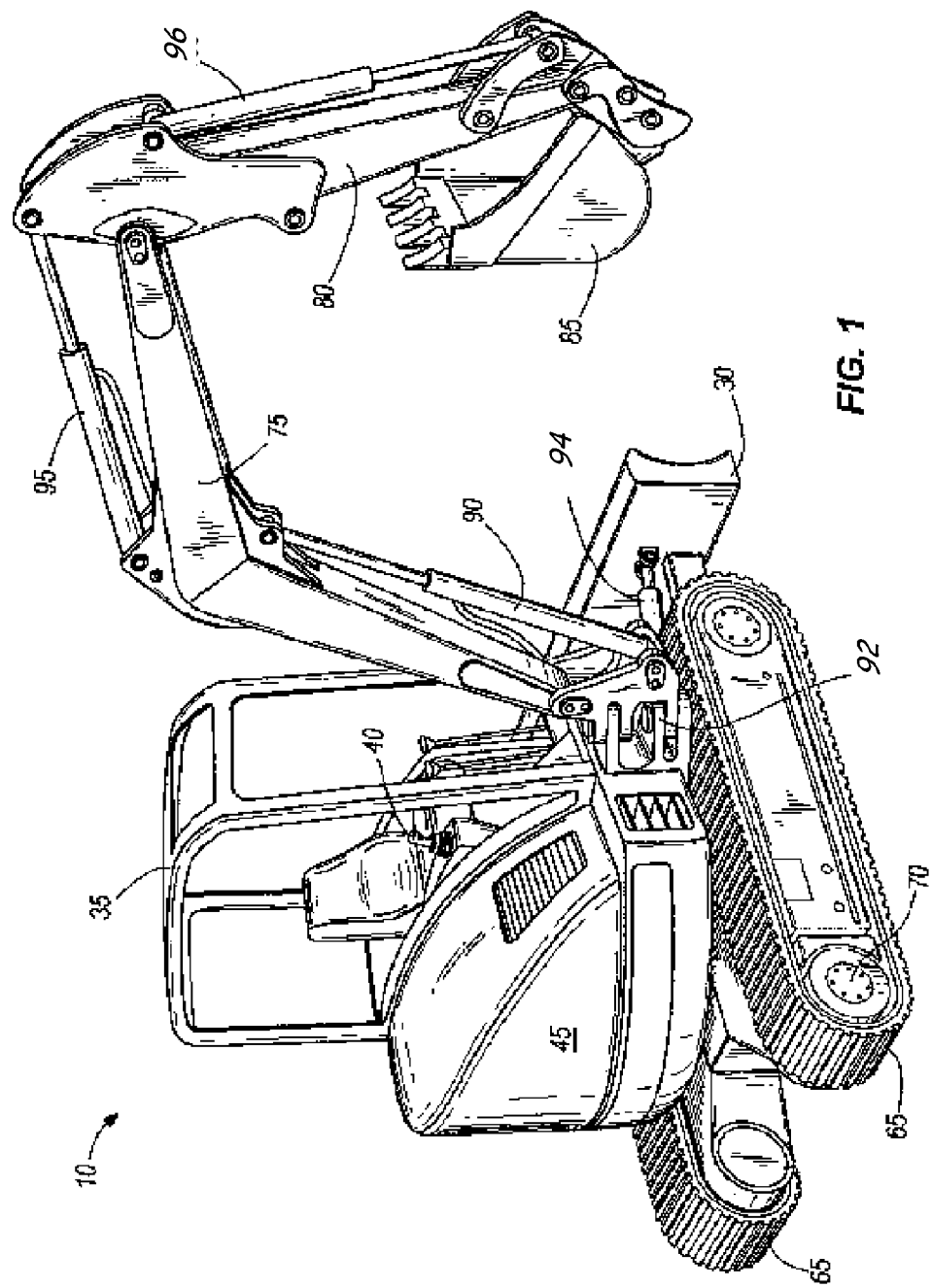
FIG. 1 is a perspective view of an exemplary power machine upon which embodiment of the present disclosure maybe advantageously employed.
Figure 1A:
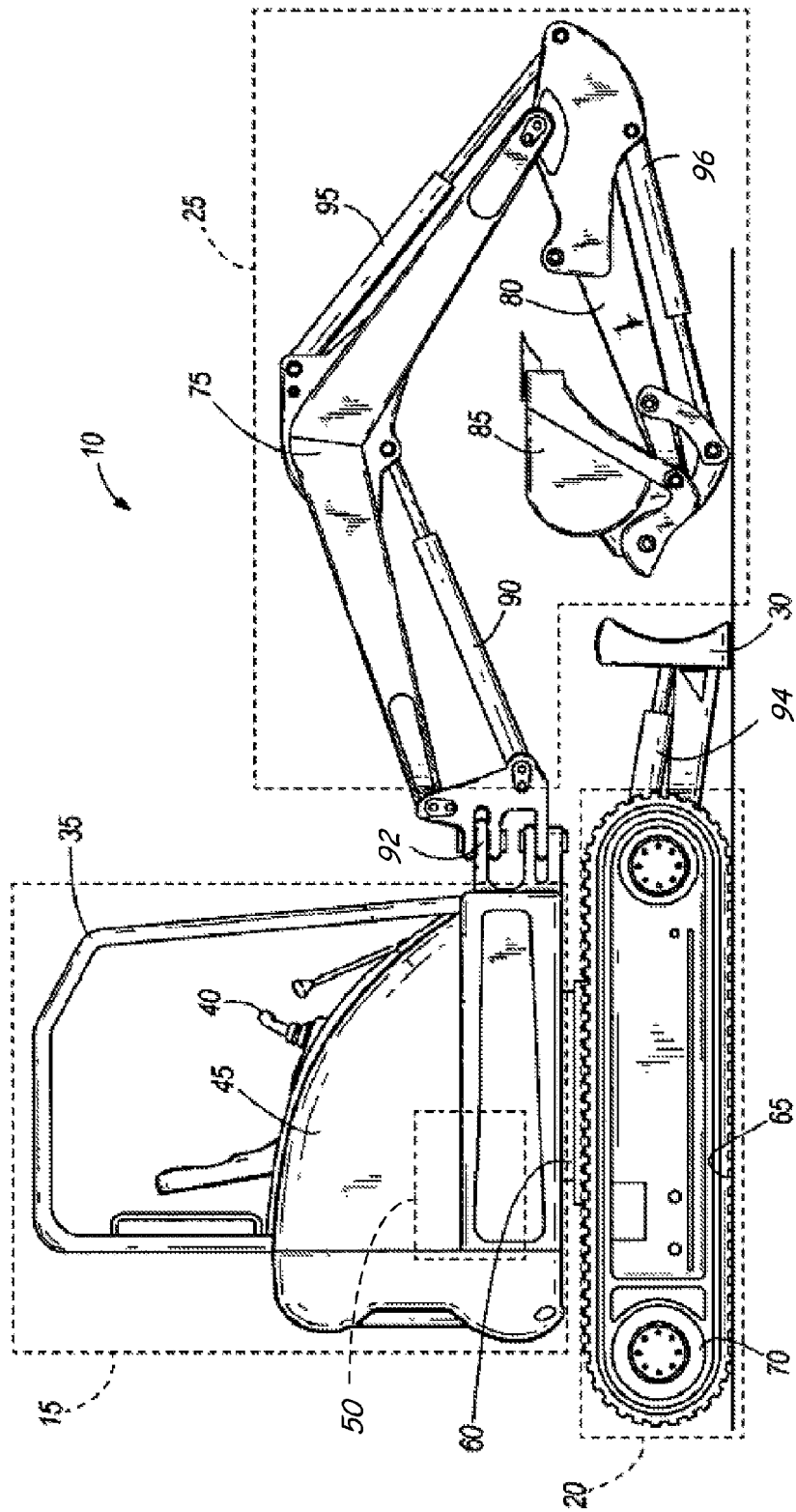
FIG. 1A is a side elevation view of the power machine of FIG. 1.

FIGS. 1 and 1A illustrate a power machine 10 of the type upon which embodiments of the present discussion may be advantageously employed. The power machine 10 shown in FIGS. 1 and 1A is generally referred to as a mini-excavator, which is one example of a tracked excavator, but it should be understood that the embodiments disclosed herein may be advantageously employed on other power machines. Some examples of the types of power machines upon which the embodiments may be employed include wheeled loaders including rigid axle skid steer loader, suspended axle loaders, and steerable axle loaders, track loaders, wheeled excavators, utility vehicles, and the like.

Power machine 10 includes a house 15, an undercarriage 20, a workgroup 25, and an undercarriage mounted implement such as a backfill blade 30. The house structure 15 includes an operator compartment 35 containing operator input devices 40 such as joysticks, switches, levers foot pedals and the like, an engine compartment or frame 45 containing an internal combustion engine and a hydraulic pressure source including one or more hydraulic pumps that are operably coupled to the engine, the combination of the engine and hydraulic pressure source shown generally as block 50 in FIG. 1A. The house 15 is attached to the top of the undercarriage 20 via a slew bearing 60. The house 15 and workgroup 25 are able to rotate or "slew" about a vertical axis on the slew bearing 60 under the influence of a slew motor (not shown) that operates under the influence of high pressure hydraulic fluid provided by the hydraulic pressure source. The operator input devices 40 are manipulable by an operator of the power machine 10 to selectively distribute the hydraulic fluid to the slew motor, the undercarriage 20, and/or the workgroup 25.

The undercarriage 20 includes rubber or steel tracks 65, drive sprockets 70, rollers, and idlers. The drive sprockets are, in one embodiment, fixed to and driven by a drive motor (not shown in FIGS. 1 and 1A) under the influence of high-pressure hydraulic fluid provided by the hydraulic pressure source through various hydraulic components, some of which will be described in more detail below. The tracks 65 rotate under the influence of the drive sprockets 70 and the power machine 10 navigates by rotating the right and left side tracks 65 forward and backward under the influence of one or more operator input devices 40.

The workgroup 25 includes a boom 75, a dipper or arm 80, an implement 85 that is attachable to the dipper, a boom cylinder 90, a dipper cylinder 95, and an implement cylinder 96. The illustrated implement 85 is a bucket, but in other embodiments, the implement may include an auger, a jackhammer, or other implements suitable for the worksite. The workgroup 25 is attached to the front of the house 15 by way of a swing frame 92 that allows the workgroup 25 to be pivoted left or right under control of an offset cylinder (not shown) to be offset with respect to the longitudinal extent of the undercarriage 20 for worksites that require digging and trenching parallel with the tracks 65 when the house 15 is not parallel to the tracks 65. The hydraulic pressure source provides pressurized hydraulic fluid to the boom, dipper, and implement cylinders 90, 95, and 96 to pivot the boom 75 with respect to the house 15, the dipper 80 with respect to the boom 75, and the implement 85 with respect to the dipper 80. The implement 85 also receives pressurized hydraulic fluid from the hydraulic pressure source to actuate a moving part of the implement with respect to other parts of the implement 85 (e.g., moving parts of implements such as augers, saws, rotary brushes, etc.).

At least one backfill blade cylinder 94 is pivotally interconnected between the backfill blade 30 and the undercarriage 20. The at least one backfill blade cylinder 94 receives pressurized hydraulic fluid from the hydraulic pressure source and extends and retracts to raise and lower the backfill blade 30 with respect to the undercarriage 20. The backfill blade 30 is used for grading, leveling, backfilling, trenching, and general dozing work. The backfill blade 30 can be lowered against the ground to lift the rest of the power machine 10 and raise the dump height of the workgroup 25. The backfill blade 30 can also be used to stabilize the power machine 10 during digging operations.

Figure 2:
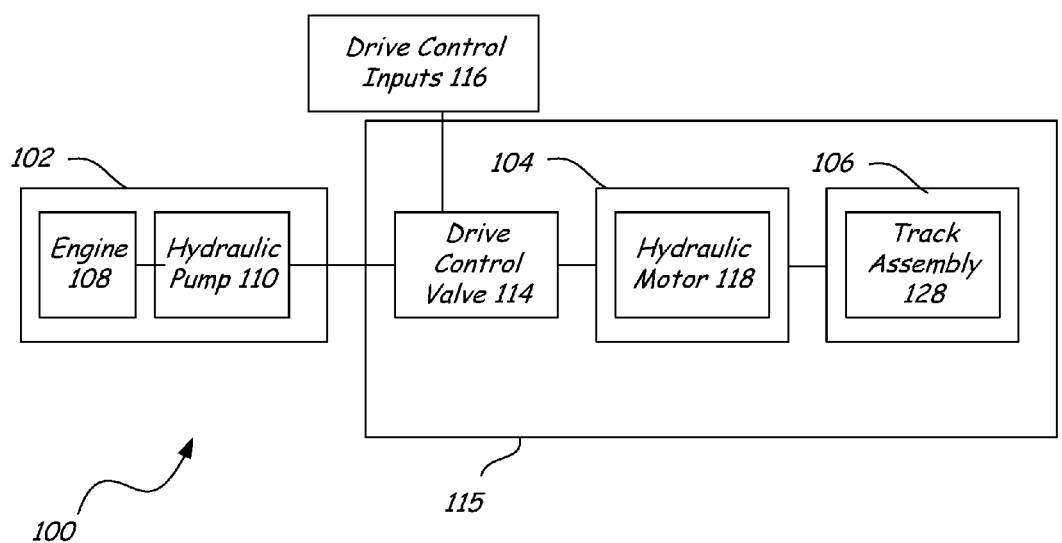
FIG. 2 is a simplified block diagram of a drive system of a power machine such as the power machine of FIG. 1 having a drive motor configurable between a first displacement and a second displacement.

FIG. 2 is a simple block diagram broadly illustrating the function of a drive system 100 for a vehicle such as power machine 10. The drive system 100 has a power source 102, which is operably coupled to a power conversion device 104. The power conversion device 104 receives a power signal (such as pressurized hydraulic fluid) from the power source 102 and converts it into an output, which is then transferred to at least one work element 106 that is operably coupled to the power conversion device 104.

Power source 102 includes an engine 108 that is operably coupled to and is configured to power a hydraulic pump 110, which should be understood to represent the one or more hydraulic pumps that are part of the hydraulic pressure source referred to above. Hydraulic pump 110, in one embodiment, is an open loop, variable displacement pump. The hydraulic pump 110 receives fluid from a hydraulic tank (not shown in FIG. 2) and provides pressurized fluid to a drive assembly 115 and more particularly a drive control valve 114. Hydraulic pump 110 can be part of a hydraulic pressure source of the type discussed above and in some embodiments is one of a plurality of hydraulic pumps in a hydraulic pressure source. Drive control valve 114 is a spool valve or any other acceptable type of valve arrangement and is shown as a stand-alone valve in FIG. 2 and subsequent FIGs. in this disclosure, but it should be appreciated that the drive control valve 114 can be part of a multiple valve assembly that controls other functions such as the workgroup 25 of power machine 10. For the purposes of this discussion, only those portions of such a valve assembly that are related to providing oil to other components in the drive assembly 115 are considered to be part of the drive control valve 114 and, by extension, drive assembly 115.

The drive control valve 114 then ports pressurized fluid to the power conversion device 104, which includes at least one hydraulic motor 118, in response to signals provided by one or more operator drive control inputs 116. Hydraulic motor 118 is illustratively an axial piston motor (although other types of hydraulic motors such as radial piston motors or geroller motors may be employed) that converts the power received from the pressurized fluid into rotational motion, which is then provided to work element 106. Work element 106 can be a track drive assembly as is depicted on the power machine 10 of FIG. 1. The track assembly 128 engages a support surface, such as ground and is capable of moving a vehicle. Alternatively, the work element 106 can be a wheel or a plurality of wheels that are operably connected to the hydraulic motor 118.

In one embodiment, hydraulic motor 118 is a two-speed hydraulic motor, meaning that it has two different displacement arrangements with a first displacement arrangement known as "low range" and a second displacement arrangement known as "high range" and that the hydraulic motor 118 can be shifted from one displacement arrangement to the other. This is accomplished in some embodiments, as discussed in more detail below, by shifting a swash plate in a hydraulic motor from one position to another. When the hydraulic motor is in low range, a larger displacement is required than when the hydraulic motor is in high range. Thus, for a given pressure and flow rate, the low range is a high torque, low speed configuration and the high range is a low torque, high-speed configuration. While the embodiments discussed herein refer to two-speed hydraulic motors, it should be appreciated that in some embodiments, hydraulic motors may be capable of being shifted into multiple ranges, including embodiments where the displacement for a given pressure and flow is infinitely variable between a minimum displacement and a maximum displacement.

Figure 3:
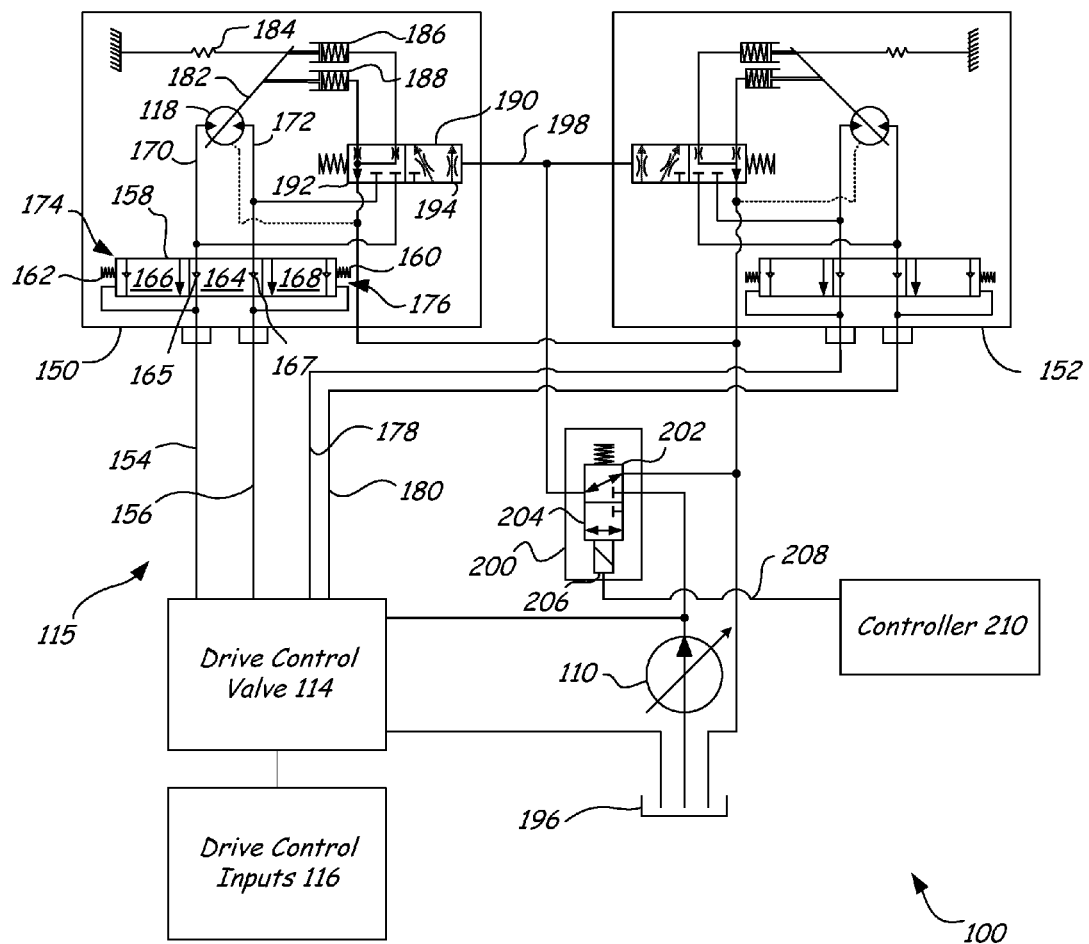
FIG. 3 is a block diagram illustrating a portion of the drive system of FIG. 2 in more detail according to one illustrative embodiment.

FIG. 3 is a block diagram that illustrates a portion of drive system 100 of FIG. 2, with additional detail provided about individual components in the drive assembly 115 of drive system 100. The drive system 100 is shown with first and second drive motor assemblies 150 and 152, each of which includes a hydraulic motor. Other drive systems with which embodiments of the present disclosure may be incorporated may have any number of drive motor assemblies. In one embodiment, first drive motor assembly 150 has an output shaft (not shown in FIG. 3) that is operably coupled to a left track and second drive motor assembly 152 has an output shaft (not shown in FIG. 3) that is operably coupled to a right track. The first and second drive motor assemblies 150 and 152 are substantially similar. For the purposes of brevity, then, only first drive motor assembly 150 will be discussed.

First drive motor assembly 150 is operably coupled to drive control valve 114 via first and second hydraulic conduits 154 and 156, respectively, which are each capable of providing hydraulic fluid to the hydraulic motor 118 of the first drive motor assembly 150 to cause the hydraulic motor 118 to rotate in response to signals provided via operator drive control inputs 116. In one embodiment, when hydraulic fluid is provided to first drive motor assembly 150 via first hydraulic conduit 154, the output shaft of the hydraulic motor 118 rotates in a clockwise direction. Conversely, when hydraulic fluid is provided to the first drive motor assembly 150 via second hydraulic conduit 156, the hydraulic motor 118 rotates in a counterclockwise direction. First drive motor assembly 150 includes a spool valve 158, which is biased to a center position by springs 160 and 162. When hydraulic fluid is not provided from the drive control valve 114 via either of the first and second hydraulic conduits 154 and 156, spool valve 158 is biased to the center position 164 and prevents fluid from being returned to drive control valve 114 via spool valve 158 because of the presence of check valves 165 and 167. When hydraulic fluid is provided from the drive control valve 114 to the first drive motor assembly 150 via first hydraulic conduit 154, a portion of the fluid is provided to an end 174 of spool valve 158 so that the pressure from the hydraulic fluid overcomes the spring 160 and shifts spool valve 158 into position 166. Fluid is then supplied to hydraulic motor 118 via hydraulic conduit 170 and returns to the drive control valve 114 via hydraulic conduit 172, spool valve 158, and second hydraulic conduit 156. Conversely, when hydraulic fluid is provided from the drive control valve 114 to the first drive motor assembly 150 via second hydraulic conduit 156, a portion of the fluid is provided to an end 176 of spool valve 158 to overcome spring 162 and shift the spool valve 158 into position 168. Fluid is then supplied to hydraulic motor 118 via hydraulic conduit 172 and returns to the drive control valve 114 via hydraulic conduit 170, spool valve 158, and first hydraulic conduit 154. As discussed above, the second drive motor assembly 152 is substantially similar to the first drive motor assembly 150. Drive control valve 114 is operably coupled to the second drive motor assembly 152 via third and fourth hydraulic conduits 178 and 180.

As discussed above, hydraulic motor 118 is an axial piston motor and displacement of the plurality of pistons (not shown) in the motor is converted into rotational motion of an output shaft. First drive motor assembly 150 also includes a swash plate 182, which is configured to engage the plurality of pistons in hydraulic motor 118. The angle of the swash plate 182 determines the maximum displacement of the hydraulic motor 118. In one embodiment, spring 184 and piston forces bias the swash plate 182 into a first swash plate position, shown in FIG. 3. When the swash plate 182 is in the first swash plate position, the hydraulic motor 118 is in low range, that is, a high torque, low speed configuration. First drive motor assembly 150 illustratively includes a pair of actuators 186 and 188 that are operably coupled to swash plate 182. Actuation of one or both of the actuators 186 and 188 illustratively causes the swash plate 182 to move from the first swash plate position, shown in FIG. 3, to the second plate position by overcoming spring 184 and forces from the pistons (not shown) in the hydraulic motor 118. When the swash plate 182 is in the second swash plate position, the swash plate 182 engages at least one of the plurality of pistons in the hydraulic motor 118, thereby reducing the overall displacement of the hydraulic motor 118. Thus, when the swash plate 182 is in the second swash plate position, the motor is in high range, that is, relative to the low range, a low torque, high-speed configuration.

Actuators 186 and 188 are illustratively hydraulic pistons, coupled to a valve 190. Valve 190 is a two-position, five-way valve. Valve 190 is biased into a first position 192, which puts actuators 186 and 188 in communication with tank 196, thereby allowing spring 184 to bias the actuators 186 and 188 to their default positions. When valve 190 is in the second position 194, hydraulic conduits 170 and 172 are in hydraulic communication with actuators 186 and 188, respectively. Therefore, whenever hydraulic fluid is provided to hydraulic conduits 170 and 172 from control valve 114 and when valve 190 is in its second position 194, hydraulic fluid is provided to at least one of actuators 186 and 188, thereby causing the swash plate to move into a second position and shift hydraulic motor 118 into its high range. While the discussion of hydraulic motor assembly 150 above refers to an assembly that employs an axial piston motor, other motors such as radial piston motors and geroller motors may have different arrangement, including different actuators that are capable of shifting the displacement of the motor in response to an external signal, as is discussed below.

Valve 190 moves from one position to another based upon the presence or absence of a signal 198 provided from an external source, which is provided in the illustrated embodiment to the valve 190 from a shift valve 200. External signal 198 is a hydraulic signal capable of causing valve 190 to move between positions 192 and 194. FIG. 3 illustrates signal 198 being connected to valve 190 in drive motor assembly 150 and a valve similar to valve 190 in drive motor assembly 152. One of ordinary skill in the art would appreciate that other configurations of signal 198 and shift valve 200 can be implemented. Shift valve 200 is a two-position, three-way valve. It is biased to a first position 202, unless signal 208 causes shift valve 200 to shift to a second position 204. When shift valve 200 is in first position 202, signal 198 is in communication with tank 196 and valve 190 is biased into the first position 192. When shift valve 200 is in the second position 204, a hydraulic signal from hydraulic pump 110 is provided to signal 198, causing valve 190 to move to the second position 194. It should be appreciated that the signal from hydraulic pump 110 provided through second position 204 may have a reduced pressure, which may be accomplished by a pressure reducing valve (not shown). It should be further appreciated that, in some embodiments, the signal provided through second position may be provided by a source other than hydraulic pump 110. In one embodiment, a solenoid 206 is operably coupled to the shift valve 200. The solenoid 206 receives a signal 208 from a controller 210 to enable the shift valve 200 to move between the first position 202 and the second position 204. In one embodiment, signal 208 is an electrical signal. It should be appreciated that other arrangements of two-speed drive motor assemblies and shifting valves can be employed to shift solely in response to a signal external to the drive motor assembly without departing from the spirit and scope of the present discussion.

Figure 4:
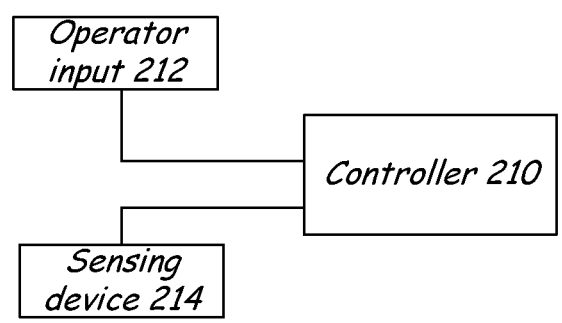
FIG. 4 is a block diagram that illustrates a controller that provides control signals for the drive system of FIG. 3 and input devices that are provided to the controller according to one illustrative embodiment.

Controller 210, in one embodiment, is an electronic controller that provides signal 208 to shift valve 200 in response to one or more inputs. FIG. 4 illustrates controller 210 and a plurality of inputs that can be used by the controller 210 to determine the status of signal 208. One input to be provided to the controller 210 is operator input 212. In one embodiment, operator input 212 is an actuable switch that is wired directly to the controller 210. Operator input can be any acceptable device and the status of the operator input can be communicated to controller 210 via wired or wireless serial communication protocols. Controller 210 can measure the state of the operator input 212, or recognize transition from one state to another as an indication of whether the operator input 212 has been actuated. A second input that, in one embodiment, is provided to the controller 210, is a sensing device 214. Sensing device 214 is configured to sense a particular condition on the machine and provide a signal to the controller 210 indicative of the given condition. In one embodiment, sensing device 214 is a pressure sensing device that is exposed to hydraulic fluid at a location in the drive system 100 so that it is capable of measuring fluid pressures in the system. In one embodiment, sensing device 214 is a variable output sensor providing an indication of a sensed pressure level. Alternatively sensing device 214 can be a switch that provides a binary output, changing states at a particular threshold. Sensing device 214 is illustratively provided to measure the fluid pressures in the drive assembly to determine when a high load condition exists. By a high load condition, it is meant that it is the engine that is subjected to a high load. In such a condition, the engine may not be able to support such a load and may eventually bog down or quit running, resulting in reduced performance. In one embodiment, it is determined that a high load condition exists when the sensing device 214 measures a pressure in the drive assembly above a given threshold level. This threshold value can be a constant pressure in any given condition or in the alternative may be variable, depending on different conditions such as the speed of the engine. It is known that one way to reduce the load on the engine is to shift the drive system from a high range displacement arrangement to a low range displacement arrangement, which provides additional torque to the drive system. Alternatively, a plurality of sensing devices can be incorporated into the drive system to measure pressure levels or other indicators that might be used to determine whether a high load condition exists and therefore whether controller 210 should provide a signal 208 to shift valve 200. The signal provided by the one or more sensing devices that are operably coupled to controller 210 can be a voltage or a current level, a wired or wireless serial communication signal or any other signal capable of being received by controller 210.

Figure 5:
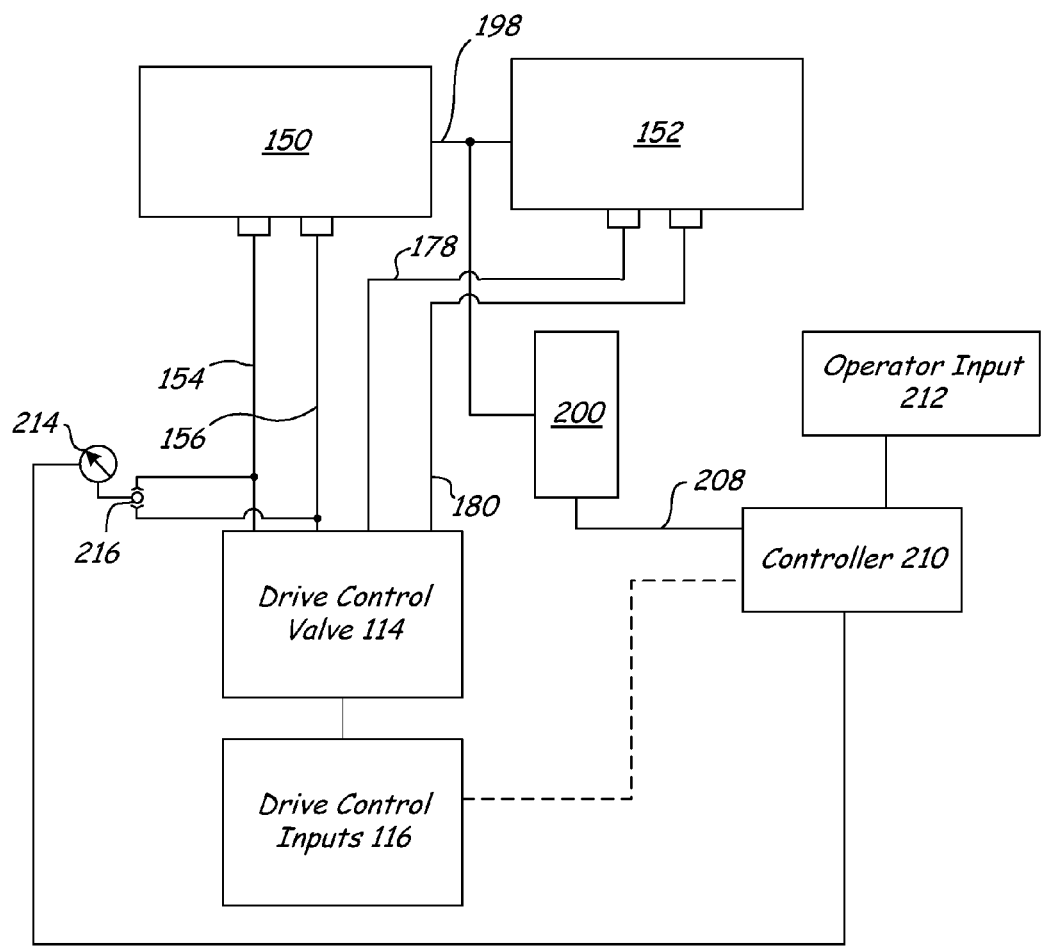
FIGS. 5-5C are block diagrams that each illustrate a portion of a drive system of the type illustrated in FIG. 2 in more detail according to another embodiment.

FIG. 5 illustrates a portion of a drive system similar to that illustrated in FIG. 3 and further including operator input 212 and sensing device 214. In the illustrated embodiment, the sensing device is exposed to fluid pressure in both first and second hydraulic conduits 154 and 156 via a shuttle valve 216, which is in communication with each of first and second hydraulic conduits 154 and 156 and operates to allow the higher fluid pressure in the two conduits to communicate with the pressure-sensing device 214. In other embodiments, sensing device 214 is exposed to fluid pressure in third and fourth hydraulic conduits 178 and 180. Alternatively, a first sensing device exposed to the fluid pressure in first and second hydraulic conduits 154 and 156 while a second sensing device is exposed to the fluid pressure in third and fourth hydraulic conduits 178 and 180. Alternatively and in addition, one or more sensing devices can be used to determine whether any of the operator drive control inputs 116 are being actuated. The sensing devices may be the operator input devices themselves or additional sensing devices that monitor the operator input devices. The relationship between the operator drive control inputs 116 and controller 210 is shown by a dashed line in FIG. 5. Signals indicative of the measured phenomena of each sensing device 214 is provided to controller 210. By measuring the pressure of the hydraulic conduits and by incorporating other collected information, the controller 210 can determine whether a drive system is being subjected to a large load that is best confronted by shifting a machine that is in high range into low range.

Figure 5A:
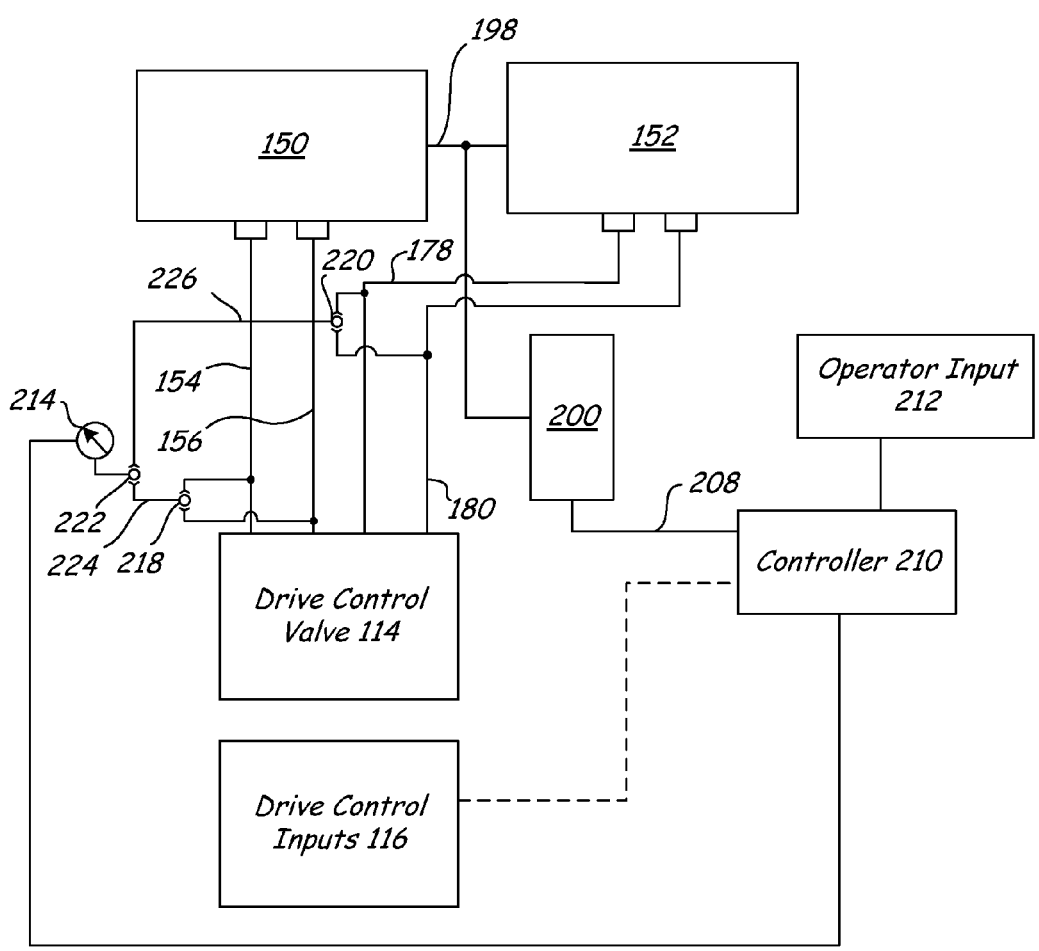

FIG. 5A illustrates an alternative embodiment of a portion of a drive system similar to that shown in FIG. 5 with similar components identified with the same reference numbers provided in FIG. 5. In the embodiment shown in FIG. 5A, a plurality of shuttle valves 218, 220, and 222 are provided to create a logic arrangement to provide the highest pressure from first, second, third and fourth hydraulic conduits 154, 156, 178, and 180 to sensing device 214. Shuttle valve 218 is in communication with first and second hydraulic conduits 154 and 156 and provides an output 224, which is the higher pressure of the two hydraulic conduits with which it is in communication. Similarly, shuttle valve 220 is in communication with third and fourth hydraulic conduits 178 and 180 and provides an output 226, which is the higher pressure of third and fourth hydraulic conduits 178 and 180. Outputs 224 and 226 are each provided to shuttle valve 222, which operates to provide the highest pressure from the outputs 224 and 226 and thus, from first, second, third and fourth hydraulic conduits 154, 156, 178 and 180, to pressure sensing device 214.

Figure 5B:
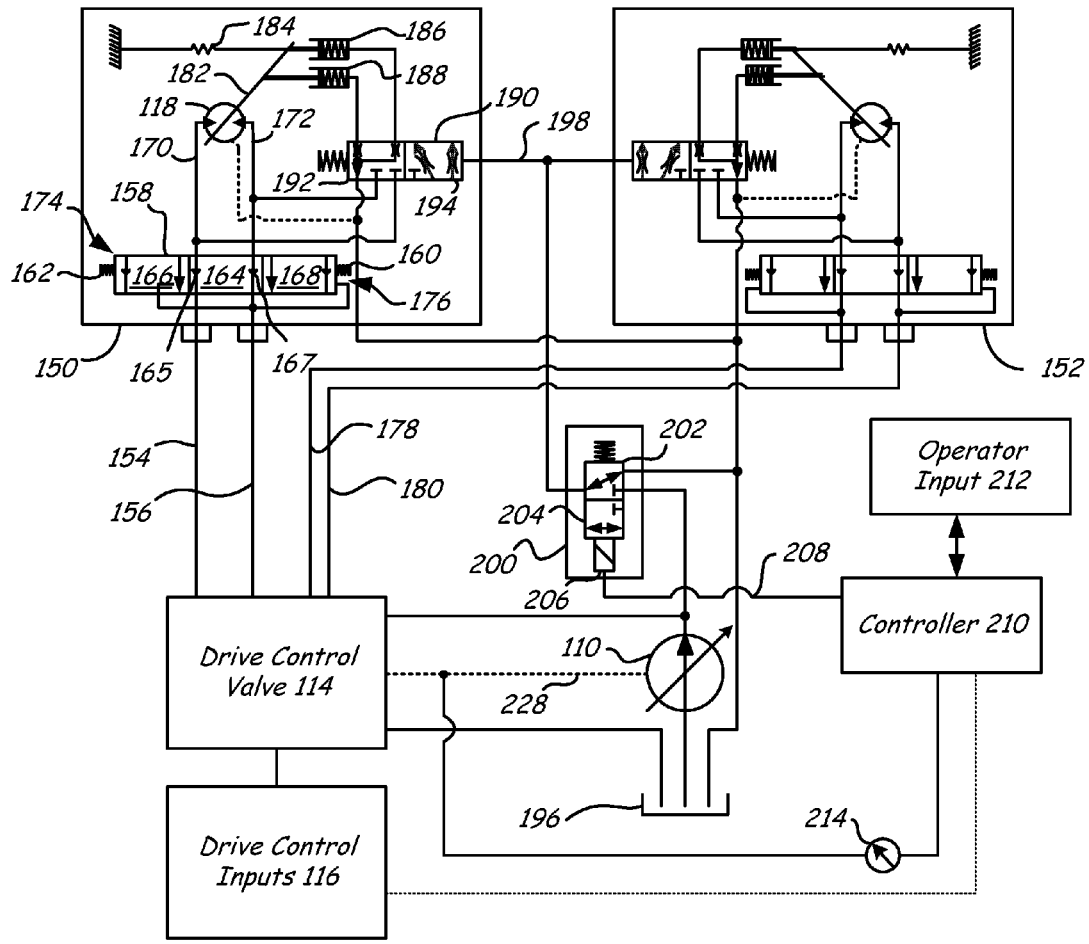
Figure 5C:
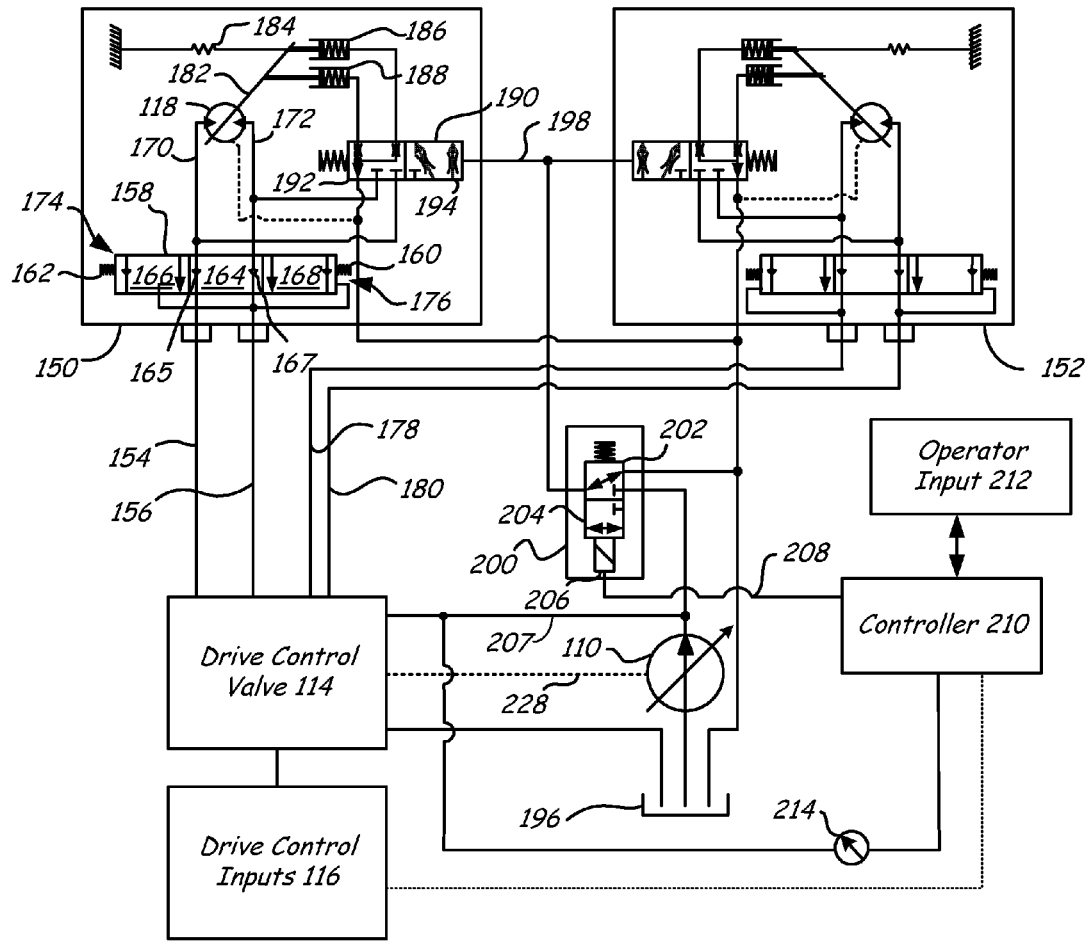

FIG. 5B illustrates another embodiment of a portion of a drive system similar to that shown in FIG. 3 and with the same reference numbers used to indicate similar components. In FIG. 5B, sensing device 214 is in communication with a load sense output 228 from the drive control valve 114. Sensing device 214 thus provides a signal to controller 210 indicative of the load sense output 228 as an input to determine a load condition on the machine. In still another embodiment, sensing device 214 is in communication with the output 207 of the hydraulic pump 110, as shown in FIG. 5C.

Figure 6:
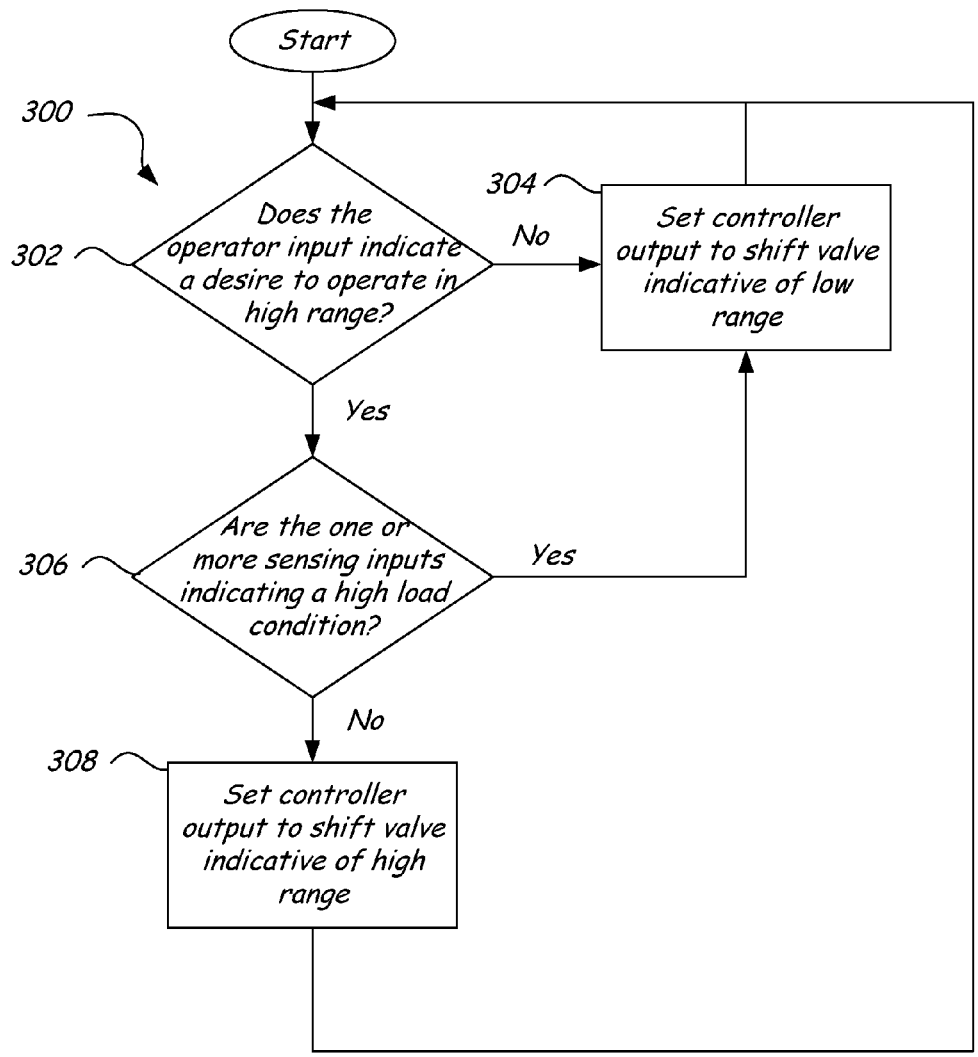
FIG. 6 is a flowchart illustrating a method for selecting between a first displacement and a second displacement in a drive motor for a power machine according to one embodiment.

FIG. 6 illustrates a method 300 of providing a two-speed signal to one or more hydraulic motors in drive motor assemblies of the type illustrated in FIGS. 3 and 5 to shift the hydraulic motors between first and second displacement arrangements. In block 302, the state of the operator input 212 is analyzed. If the state of operator input 212 indicates a desire on the part of an operator to operate the drive system in low range, the control signal 208 is set to a low range condition so as to allow shift valve 200 to return to a biased position, that is to move the spool to prevent pressurized hydraulic fluid to flow from the pump through shift valve 200 to the valve 190. As a result, the actuators 186 and 188 are not exposed to pressurized fluid, swash plate 182 is urged into the first position, and hydraulic motor 118 is in the high displacement, low speed position. This is indicated in block 304. If at block 302 the state of operator input 212 indicates a desire on the part of an operator to operate the drive system in high range but the controller determines that the machine is in a high load condition, as shown at block 306, controller 210 sets the control signal 208 to a low range condition. As discussed above, when the control signal 208 is set to a low range condition, shift valve 200, in one embodiment, is positioned to allow valve 190 to shift to position 192 so as to allow pressurized hydraulic fluid from pistons 186 and 188 to return to tank 196 and therefore allow swash plate 182 to move to or stay in the first swash plate position.

However, if at block 306 it is determined that the power machine is not in a high load condition, the control signal 208 is set to a high range condition, thereby allowing the swash plate 182 to move or stay in a second swash plate position. This is shown in block 308. As shown in FIG. 6, once an operation is performed at block 304 or 308, the routine returns to block 302 and is performed again. It should be appreciated that there may be a small time delay between each performance of the routine, but effectively, the method 300 is performed often enough to provide virtually continuous monitoring of power machine conditions that might make an automatic shifting of the hydraulic drive motors advantageous. It should also be appreciated that time delays, in some embodiments, may be incorporated to require high load conditions at block 306 to be present or absent for a period of time before providing a signal indicative of a shift. For example, if a shift valve is in a high range condition, method 300 may require the presence of a high load condition for a certain period of time before providing a shifting signal to shift the motors into a low range condition. Similarly, if the machine is in a low range condition, having been shifted into the condition because of the sensing of a high load condition, the method 300 may require the absence of a high load condition for a period of time before providing a shifting signal to shift the motors into a high range condition. It should be understood that in different embodiments, different hydraulic components may function differently to the control signal 208 and such differences are within the scope of the current discussion.

The embodiments discussed herein provide many advantages. As controller 210 can include memory to hold data, the pressure level at which it is determined that a high load condition exists can be stored as a set point in memory. In addition, multiple set points can be stored and used to make high load determinations in different situations. In addition, set points for other sensing devices can be stored in the memory of controller 210 to help determine whether a power machine is in a high load condition. For example, an engine speed set point can be stored in the memory of controller 210 and controller 210 can monitor engine speed or communicate with other controllers (not shown in any figures) on a power machine to receive engine speed data. Controller 210 can also monitor a plurality of pressure sensing devices and have customizable set points for each of the pressure sensing devices, thereby providing the controller 210 with a variety of inputs to determine whether to provide a signal that is indicative of high range or low range.

Figure 7:
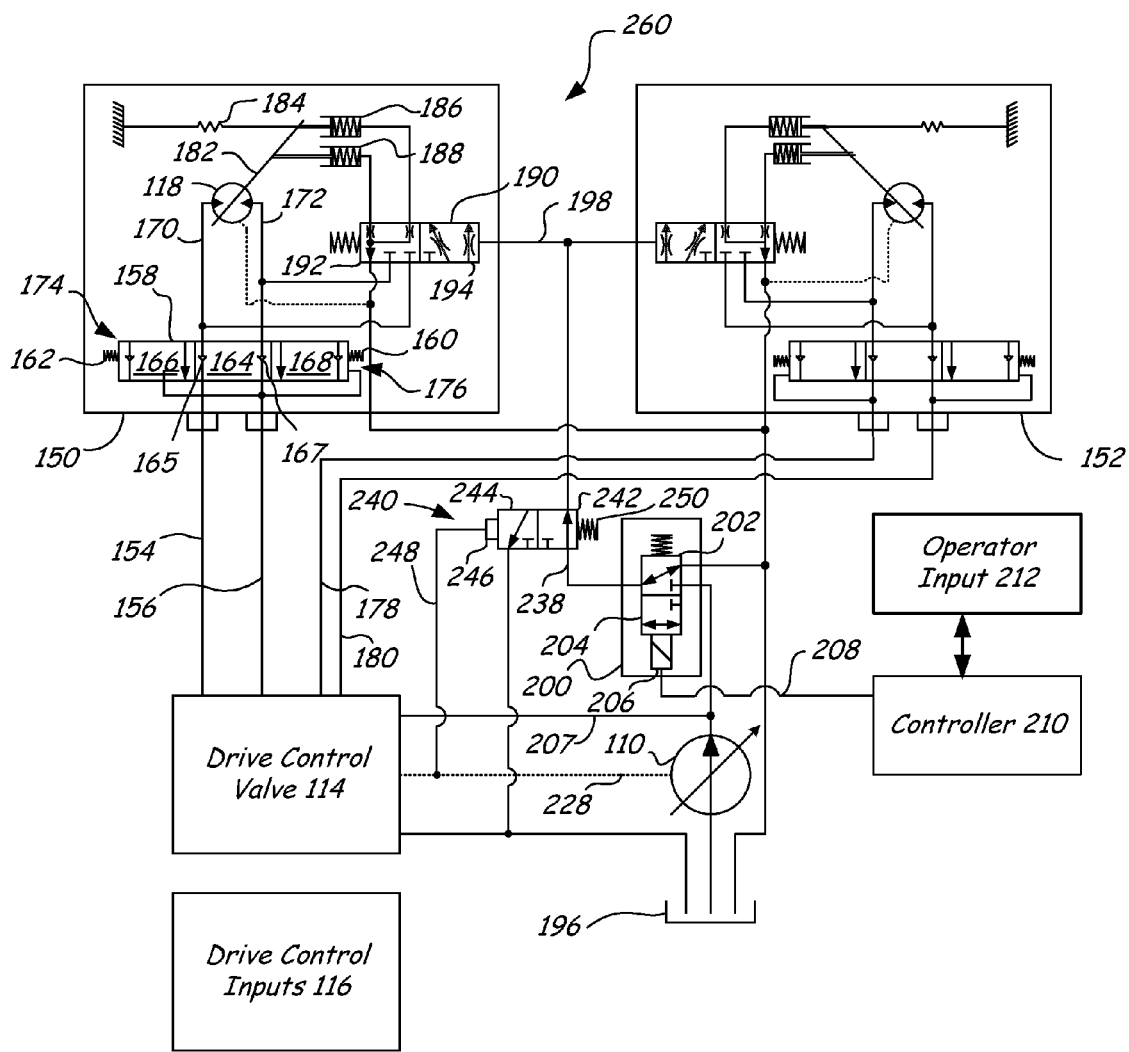
FIG. 7 is a block diagram that illustrates a portion of a drive system of the type illustrated in FIG. 2 in more detail according to another embodiment.

FIG. 7 illustrates a portion of a drive system 260 similar to drive system 100 according to another illustrative embodiment. Some of the components illustrated in FIG. 7 are the same or substantially similar to those illustrated in FIG. 3 and that similarity is represented by identical reference numbers as those used in FIG. 3. Description of those components is generally not provided here for the sake of brevity.

As with the drive system of FIG. 3, drive system 260 has a shift valve 200, which receives a signal 208 from controller 210 to cause shift valve 200 to move between first position 202 and second position 204. Output 238 is provided as an input to an additional shifting valve 240, which is a two-position, three-way valve. When shifting valve 240 is in a first position 242, signal 198 is in communication with output 238 of shift valve 200. When shifting valve 240 is in second position 244, signal 198 in communication with tank 196. Spring 250 illustratively urges shift valve 240 toward the first position 242. An input port 246 is in communication with conduit 248 to provide a pressure to input port 246. When the pressure provided at input port 246 is sufficient enough to overcome the force of spring 250, shift valve 240 is moved into the second position 244. In one embodiment, conduit 248 is in communication with load sense output 228 from hydraulic pump 110. Alternatively, conduit 248 can be in communication with an output 207 from hydraulic pump 110 or from a shuttle valve of the type illustrated in FIGS. 5 and 5A to measure the highest pressure from any combination of pressure lines in the drive system 260, including, for example, any combination of first, second, third, and fourth hydraulic conduits 154, 156, 178, and 180.

Figure 8:
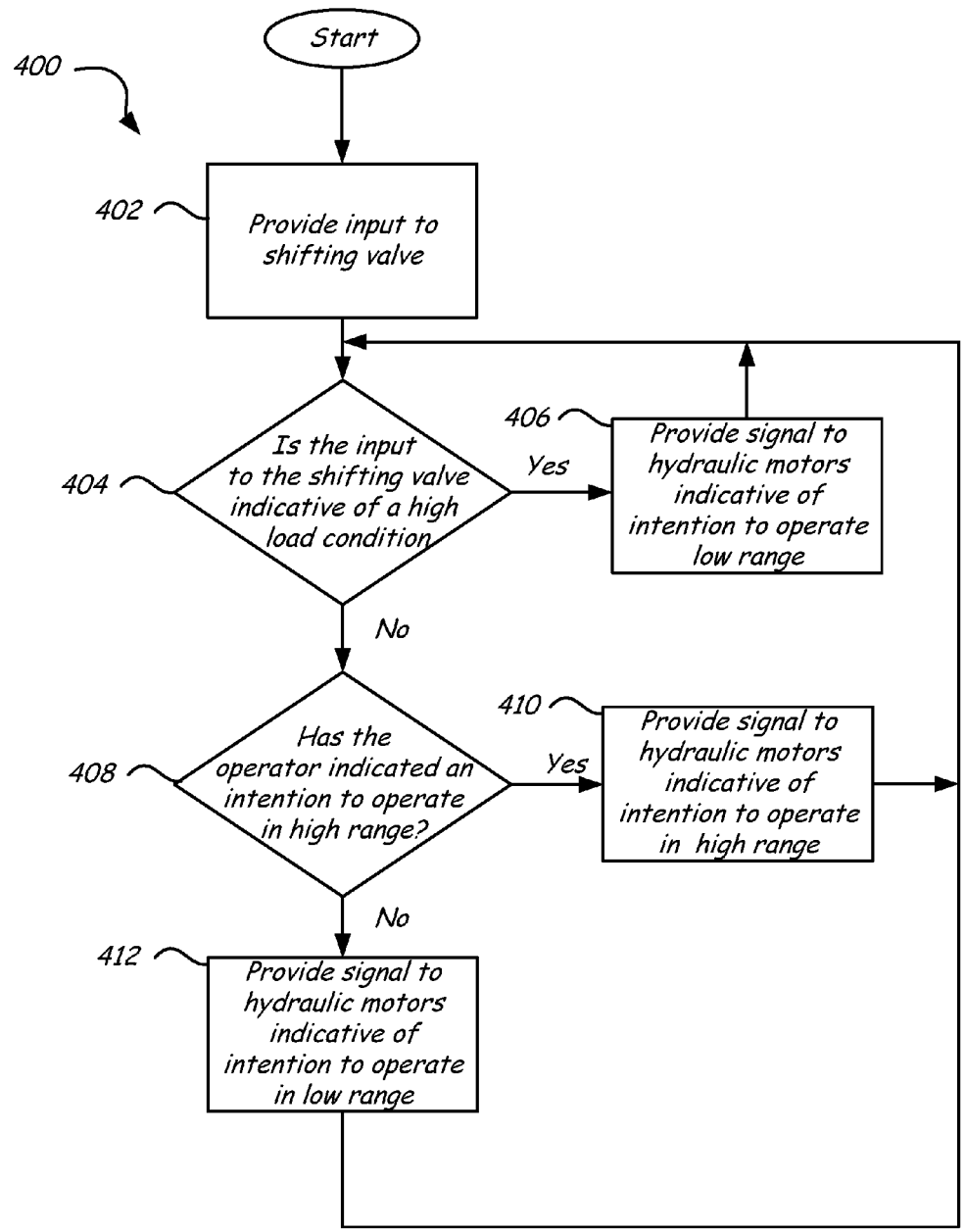
FIG. 8 is a flow chart that illustrates a method of controlling the displacement arrangement of a motor according to one illustrative embodiment.

FIG. 8 illustrates a method 400 of controlling the signal 198 provided to drive motor assemblies 150 and 152 as illustrated in FIG. 7. Signal 198 provides an indication to drive motor assemblies 150 and 152 as to whether the motors 118 in each of the drive motor assemblies should be in a low range displacement arrangement or a high range displacement arrangement, each of which is described in detail above. At block 402, an input 248 is provided to input port 246 of shifting valve 240. At decision block 404, the level of input 248 is evaluated. If the input 248 is sufficient to overcome spring 250, signal 198 provided to drive motor assemblies 150 and 152 is indicative of an intention to position the drive motor assemblies 150 and 152 in a low range condition, as is shown in block 406. This is illustratively accomplished by placing shifting valve 240 into second position 244, thereby putting signal 198 and, by extension, valve 190 in communication with tank 196. When shifting valve 240 is in the second position 244, it does not matter what the output signal 208 from controller 210 is providing to shift valve 200; signal 198 is effectively controlled exclusively by shifting valve 240.

Returning to decision block 404, if the input 248 is not sufficient to move shifting valve 240 to the second position 244, shifting valve 240 is in the first position 242, and signal 198 is in communication with output 238. The method 400 then determines the status of the shift valve 200. This is illustrated at block 408. If the shift valve 200 is in the first position 202, indicating that an operator input 212 has been manipulated to indicate a preference of an operator to operate the power machine 10 in low range, output 238 and signal 198 are in communication with tank 196, thereby sending an indication to position the drive motor assemblies 150 and 152 to a low range condition. This is illustrated in block 412. Returning to block 408, if the shift valve 200 is in the second position 204, indicating that an operator input 212 has been manipulated to indicate a preference of an operator to operate the power machine 10 in high range, output 238 and signal 198 are in communication with hydraulic pump 110, thereby providing an indication to position the drive motor assemblies 150 and 152 to a high range condition. This is indicated by block 410.

Figure 9:
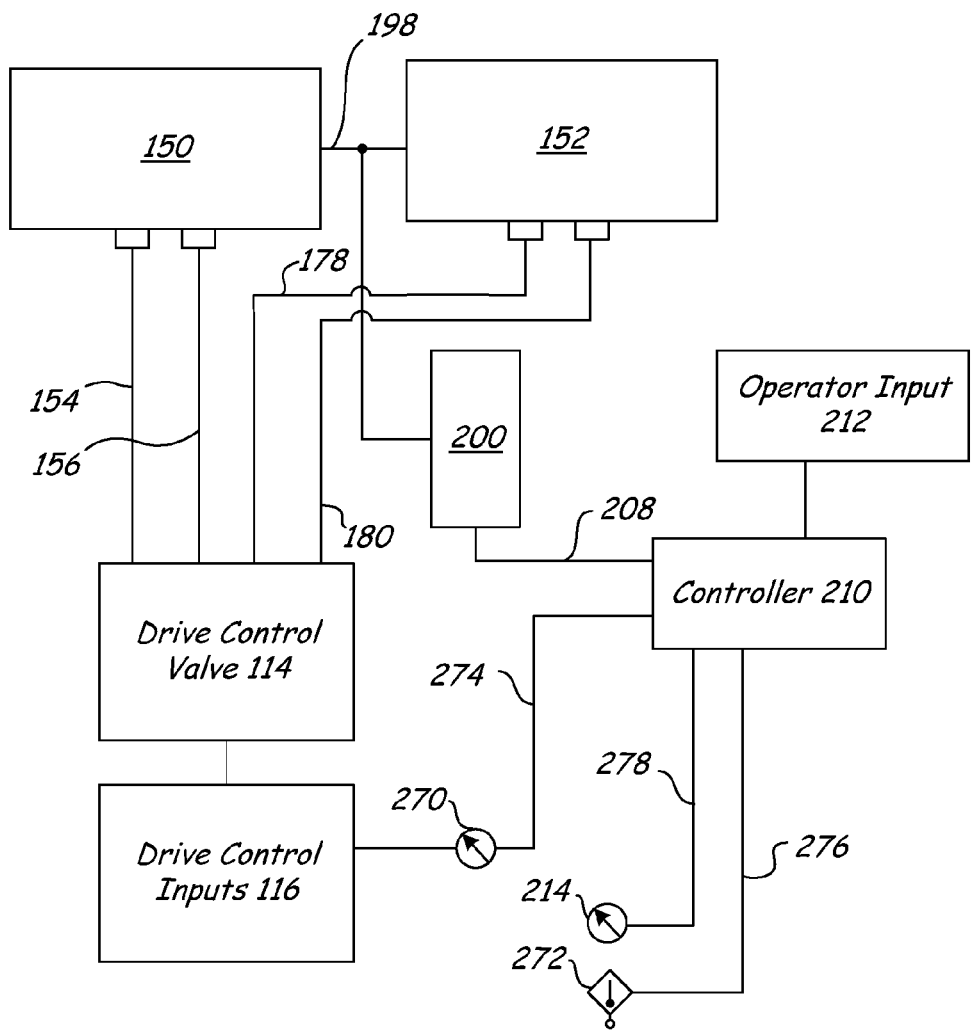
FIG. 9 is a block diagram that illustrates a portion of a drive system of the type illustrated in FIG. 2 in more detail according to another embodiment.
Figure 10:
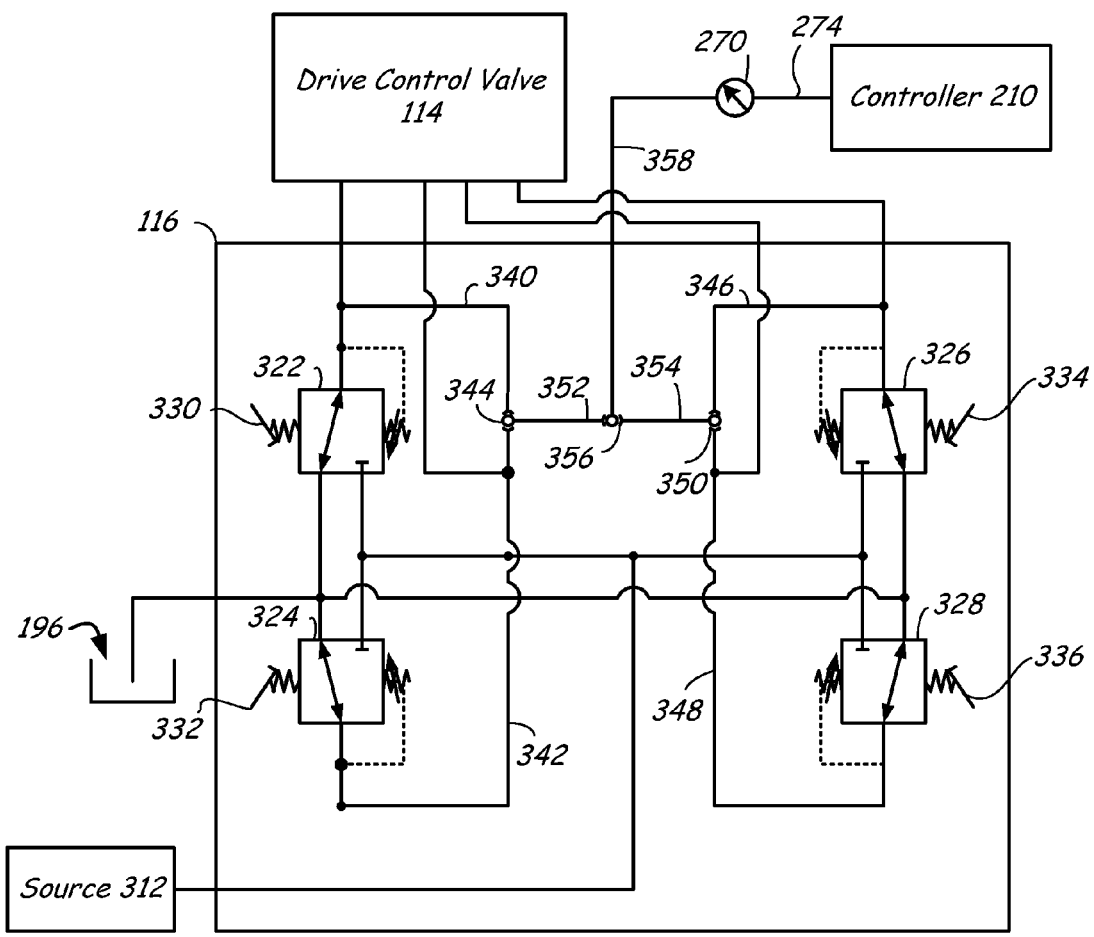
FIG. 10 is a block diagram that illustrates a portion of a drive system of the type illustrated in FIG. 2 in more detail according to another embodiment.

FIG. 9 is an illustration of a portion of a drive system 300 according to yet another embodiment. Drive control valve 114 is operably connected to first and second drive motor assemblies 150 and 152 via first, second, third, and fourth hydraulic conduits 154, 156, 178, and 180 to provide hydraulic fluid to the first and second drive motor assemblies 150 and 152 as generally discussed above. A controller 210 provides an output signal 208 to a shift valve 200, which provides a signal 198 to the first and second drive motor assemblies 150 and 152. Drive control inputs 116 are manipulable by an operator to provide control signals to the drive control valve 114. A sensing device 270 senses the status of the drive control inputs 116 and provides a signal 274 to controller 210. In one embodiment, the drive control inputs 116 provide hydraulic signals to the drive control valve 114 as will be discussed in more detail below. Sensing 270, the embodiment, is a variable output pressure sensor capable of measuring a pressure level. Alternatively, sensing device 270 is a switch that changes state at a given pressure level. An illustration of one configuration of drive control inputs and corresponding sensing device 270 is provided in FIG. 10 and is discussed in more detail below. In still other embodiments, a signal is sent to the controller 210 that is indicative of the status of the drive control inputs 116 without the employment of a device such as sensing device 270. For example, in some embodiments, drive control inputs 116 can be electrical devices, the signal 274 is a current, voltage, or digital signal indicative of the status of the drive control inputs provided to the controller without a sensing device 270. In other embodiments, one or more sensing devices can measure movement of actuation devices such as 330, 332, 334, and 336, which are shown in FIG. 10 and discussed below. Such sensing devices can be proximity sensors, linear variable differential transformers (LVDTs), and the like. It should be appreciated that a number of other types of sensing devices can measure when drive control inputs have been actuated, in addition to those discussed here. Additionally, sensing device 214 provides a signal 278 to the controller 210 indicative of the pressure in the drive system 300. Although not shown connected to any particular part of the drive system 300, it should be understood that sensing device 214 could be connected to any suitable location in the drive system 300, including locations discussed in previous embodiments. In addition, an indicator 272 can provide a signal 276 to controller 210 indicative of the temperature of hydraulic fluid in the drive system 300. In one embodiment, indicator 272 is a temperature sensor. Alternatively, one or more additional sensors or switches can provide signals to controller 210 indicative of various machine conditions, the status of which is, in some embodiments, used by the controller 210 to determine the appropriate control signal to send to the shift valve 200.

FIG. 10 illustrates drive control inputs 116 according to one illustrative embodiment. Drive control inputs 116 include, in the embodiment shown in FIG. 10 a plurality of hydraulic valves 322, 324, 326, and 328 that are configured to be actuated by an operator and provide an input signal to the control valve 114. A hydraulic source 312 is provided to the inputs. Hydraulic source 312 can be provided from a pump such as hydraulic pump 110 or any other suitable source. The valves 322, 324, 326 and 328 are operably coupled to actuation devices 330, 332, 334, and 336, respectively. When in an unactuated condition, each of the valves 322, 324, 326 and 328 are open to tank 196 and provide a non-pressurized signal to the control valve 114, which is indicative of an unactuated signal. In one embodiment, the actuation devices 330 and 332 are coupled together so that only one of the two actuation devices can actuate one of the hydraulic valves 322 and 324 at any given time. Thus, at most, only one of the hydraulic valves 322 and 324 can provide an actuation signal, with an actuation signal being pressurized fluid to the control valve 114. In one embodiment, actuation devices 330 and 332 are opposing sides of a foot pedal that pivots in two directions about a pivot point. Similarly, actuation devices 334 and 336 are similarly coupled such that only one of valves 326 and 328 can be actuated at any one time.

Output lines 340 and 342 from valves 322 and 324 are provided to opposing sides of a shuttle valve 344. Similarly, output lines 346 and 348 are provided to opposing sides of a shuttle valve 350. Output 352 of shuttle valve 344 and output 354 of shuttle valve 350 are provided to opposing sides of shuttle valve 356. The output 358 of shuttle valve 356 is thus provided to sensing devices 270, which in turn provides signal 274 to controller 210. Thus, whenever at least one of the valves 322, 324, 326, and 328 are actuated, sensing devices 270 is provided with a pressure indicative of that actuation. Sensing devices 270 then provides signal 274 to indicate whether any of the valves 322, 324, 326, and 328 are actuated.

Figure 11:
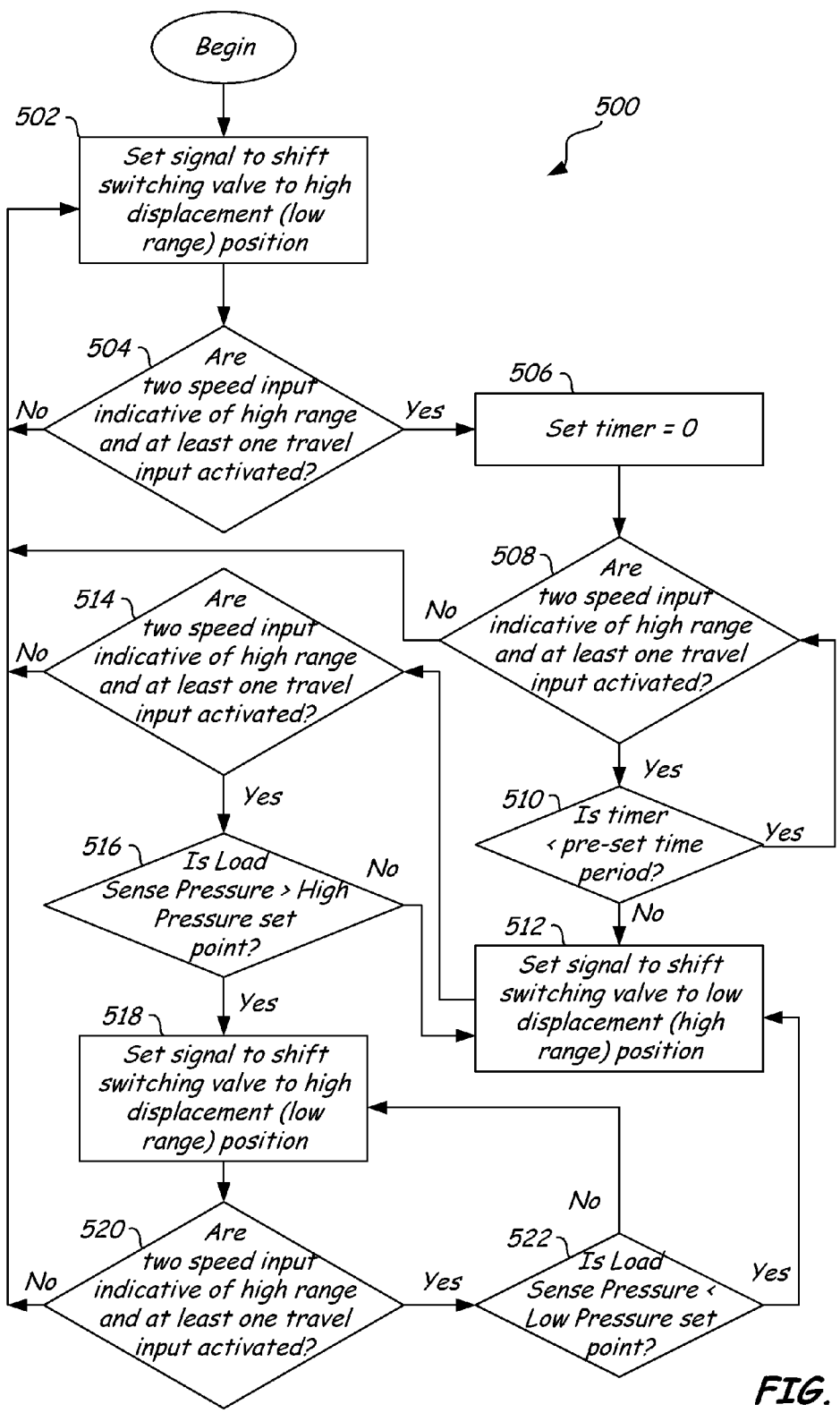
FIG. 11 is a flow chart that illustrates a method of controlling the displacement arrangement of a motor according to one illustrative embodiment.

Controller 210 illustratively provides signal 208 to shift valve 200 based on the signals 274, 276, and 278. One embodiment of a method 500 of providing a signal to the shift valve 200 is illustrated in FIG. 11. At block 502, signal 208 is provided to the shift valve 200 so that shift valve provides a signal 198 to each of the first and second drive motor assemblies 150 and 152 that is indicative of a high displacement, low range position. The settings illustrated at block 502 are considered a first state of operation for the method 500. At block 504, the signal 274 and operator input 212 are considered. If signal 274 indicates that at least one of the drive control inputs 116 is actuated and operator input 212 indicates the intention of an operator to operate the power machine 10 in a low displacement arrangement, i.e., a high range condition, and method 500 moves to block 506. Otherwise, method 500 returns to block 502 and remains at the first state of operation. At block 506, a timer is set.

At block 508, the status of the signal 274 and operator input 212 are considered. If the signal 274 indicates that none of the drive control inputs 116 is actuated or if operator input 212 indicates that the operator intends to operate the power machine in a high displacement, low range condition, the method 500 returns to block 502, which, as is discussed above, is the first state of operation. If, however, the signal 274 provided by sensing devices 270 to controller 210 indicates that at least one of the drive control inputs 116 is actuated and operator input 212 indicates that the operator intends to operate the power machine 10 in the low displacement, high range condition, the method moves to block 510. At block 510, the timer is compared to a pre-determined time period and if it has been running for longer than the pre-determined time period since being reset in block 506, the method moves to block 512. If not, the method moves back to block 508 to re-examine the status of signal 274 and operator input 212. Effectively, then, the loop shown in blocks 508 and 510 form a transition state. In this transition state, a period of time must pass before it can be determined whether the operator intended to operate the power machine in high range and whether at least one of the drive control inputs was being operated during the entire time period. During this transition state, the output signal 208 remains as it was in the first state of operation. If these conditions for transition are satisfied, the method moves to the second state of operation at block 512. Otherwise, the method moves back to the first state of operation at block 502.

In the second state of operation, the signal 208 sent to shift valve 200 is indicative of having the shift valve send a signal 198 to the first and second drive motor assemblies to shift to a low displacement, high range position. Once the method moves to the second state of operation, method 500 moves to block 514, which examines the signal 274 and the operator input 212 to determine whether the method should move back to the first state. If it is determined that the operator continues to signal an intention to operate the power machine 10 in high range and is operating at least one of the drive control inputs, the method does not return to the first state of operation.

The signal 278 is then examined to determine whether the pressure measured by sensing device 214 is higher than a high-pressure set point. If it is determined that the pressure measured is higher than the high-pressure set point, the method moves to block 518, which is the third state of operation. If, however the pressure measured at block 516 is lower than the high-pressure set point, the method returns to block 512 and remains in the second state of operation.

In the third state of operation, the controller 210 sends a signal 208 to shift valve 200 so that shift valve, in turn sends a signal 198 to the first and second drive motor assemblies 150 and 152 to cause the drive motor assemblies to shift to a high displacement, low range position. Once the signal 208 is sent by controller 210, the controller 210 analyses the status of the signal 274 and the operator input 212 to determine whether the operator is still operating one or more drive control inputs and still indicates a desire to operate in the low displacement, high range condition, as is illustrated at block 520. If it is determined that the operator intends to operate the power machine in a low displacement, high range condition, the pressure indicated by signal 278 is compared to a low pressure set point. If the pressure signal 278 indicates a pressure below the low-pressure set point, the method moves to the second operation state, illustrated at block 512. If the pressure indicated by pressure signal 278 is not below the low-pressure set point, the method remains at the third operating state, at block 518.

As discussed above, in some embodiments, high and low pressure set points are established to determine when to shift between the second and third operating states. Each of the high and low pressure set points are, in some embodiments a single value. Alternatively, the high and low-pressure set points can be set at different pressure levels based on the temperature of the hydraulic fluid in the power machine. As discussed above, indicator 272 is illustratively in communication with hydraulic fluid at an acceptable location in the drive system. Indicator 272 provides a signal 276 to the controller 210 that is indicative of the temperature of the hydraulic fluid. The controller 210 is configured to adjust the high and low-pressure set points based on the temperature provided. The set points can be established as a series of temperatures ranges. Actual temperatures may vary from one drive system to another, but are set at levels that improve shifting at various temperatures.

The embodiments above provide several important advantages. By providing an automated shifting mechanism that interfaces with multiple speed hydraulic motors, power machines can be controlled in a way that improves operational efficiency with reduced input required from an operator. By implementing the states of operation as described above, the power machine will not be in a low displacement, high range condition at any time when the power machine is not being operated, thereby reducing the likelihood of the power machine creeping. The embodiments disclosed herein can be implemented on any type of multiple speed hydraulic motor.

What is claimed is:

1. A power machine having a drive system for propelling the power machine over a support surface, comprising:
   a hydraulic pressure source including at least one hydraulic pump capable of providing pressurized fluid as an output;
   a drive assembly including:
      a hydraulic motor in fluid communication with the hydraulic pressure source and switchable between a first displacement arrangement and a second displacement arrangement, the first displacement arrangement having a larger displacement than the second displacement arrangement;
      a drive control valve operably coupled to the hydraulic pressure source and configured to provide pressurized fluid from the hydraulic pressure source to the hydraulic motor to cause the hydraulic motor to rotate;
      a shift valve configured to receive pressurized fluid from the hydraulic pressure source and provide a shift signal to the hydraulic motor for selecting one of the first displacement arrangement and the second displacement arrangement; and
      a sensing device capable of generating a load signal indicative of a load condition provided by the drive assembly; and
   an electronic controller in communication with the sensing device and configured to provide a control signal to the shift valve to control the displacement of the hydraulic motor in response at least in part to the load signal; and
   wherein the shift valve is also in communication with the drive control valve and wherein the drive control valve is configured to provide a pressure signal to a shift mechanism of the shift valve, the shift valve further configured to select one of the first and second displacement arrangements in response to the pressure signal provided to the shift mechanism of the shift valve.

2. The power machine of claim 1 and further comprising:
   a first operator input configured to provide an arrangement signal indicative of an intention of an operator to operate the drive system in one of the first displacement arrangement and the second displacement arrangement.

3. The power machine of claim 2, wherein the electronic controller is configured to provide the control signal to the shift valve for operating the hydraulic motor in the second displacement arrangement when the arrangement signal indicates an intention to operate the drive system in the second displacement arrangement and when the load signal indicates a load below a load threshold.

4. The power machine of claim 2, wherein the electronic controller is configured to provide the control signal to the shift valve for operating the hydraulic motor in the first displacement arrangement when the load signal indicates a load above the load threshold.

5. The power machine of claim 2, and further comprising:
at least one drive control input device moveable from a neutral position to an actuated position, each of the at least one drive control input devices being configured to provide an intention of an operator to move the power machine when in an actuated position; and
wherein the electronic controller is configured to provide the control signal to the shift valve indicative of operating the hydraulic motor in the first displacement arrangement whenever each of the at least one drive control input devices is in a neutral position.

6. The power machine of claim 5, and further comprising:
a drive control input sensing device configured to sense a position of the at least one drive control input device and provide a drive control input signal to the electronic controller.

7. The power machine of claim 6, wherein the electronic controller is configured to provide the control signal to the shift valve for operating the hydraulic motor in the second displacement arrangement when the arrangement signal is indicative of an intention to operate the drive system in the second displacement arrangement, when the load signal indicates a load below a load threshold, and when the drive control input signal indicates that at least one of the drive control input devices is in an actuated position.

8. The power machine of claim 5, wherein the drive control input device is moveable to indicate an intention to move the power machine in a forward direction and wherein moving the drive control input device to indicate an intention to move the power machine in a forward direction causes the drive control input device to provide a signal indicative of an actuated position.

9. The power machine of claim 5, wherein the drive control input device is moveable to indicate an intention to move the power machine in a reverse direction and wherein moving the drive control input device to indicate an intention to move the power machine in a reverse direction causes the drive control input device to provide a signal indicative of an actuated position.

10. The power machine of claim 1, wherein the sensing device is a pressure sensor configured to measure hydraulic pressure at an outlet of the hydraulic pump.

11. The power machine of claim 1, wherein the sensing device is a pressure sensor configured to measure a highest pressure selected from a plurality of sources in the drive assembly.

12. The power machine of claim 1, wherein the sensing device is a first sensing device and further comprising a second sensing device capable of providing an indication of a machine condition and wherein the electronic controller is configured to provide the control signal to the shift valve in response to the indication provided by the second sensing device.

13. A method of propelling a power machine having a drive assembly with hydraulic motor capable of driving a tractive element, the hydraulic motor capable of being shifted between a first displacement arrangement and a second displacement arrangement having a smaller displacement than the first displacement arrangement, the method comprising:
selectively providing pressurized fluid from a hydraulic pressure source to the hydraulic motor though a drive control valve to cause the hydraulic motor to rotate while operating in a selected one of the first displacement arrangement and the second displacement arrangement;
providing a shift valve to cause the hydraulic motor to select one of the first displacement arrangement and the second displacement arrangement; and
controlling the shift valve by providing a shift valve signal from an electronic controller to the shift valve in response to a load signal from a load sensing device that provides an indication of a load provided by the drive assembly to the electronic controller;
providing a pressure signal from the drive control valve to a shift mechanism of the shift valve; and
controlling the shift valve to select one of the first and second displacement arrangements in response to the pressure signal provided to the shift mechanism of the shift valve.

14. The method of claim 13, wherein controlling the shift valve further comprises providing a shift valve signal and wherein the shift valve causes the hydraulic motor to select the first displacement arrangement whenever the load signal indicates a load above a given threshold.

15. The method of claim 14, wherein controlling the shift valve further comprises receiving a displacement selection signal from an operator input device indicative of an intention to select one of the first displacement arrangement and the second displacement arrangement and wherein the shift valve causes the hydraulic motor to select the first displacement arrangement when the operator input device is indicative of an intention to select the second displacement arrangement and the load signal indicates a load below a given threshold.

16. The method of claim 14, wherein controlling the shift valve further comprises receiving an indication of one of a neutral position and an actuated position from each input device dedicated to controlling propulsion of the power machine, and wherein the shift valve signal causes the hydraulic motor to select the first displacement arrangement whenever each input device provides an indication of being in the neutral position.

17. The method of claim 13, wherein a load signal is provided by a sensing device capable of receiving a pressure signal from a highest pressure level selected from a plurality of pressure nodes within the drive assembly.

18. A drive system for a power machine, comprising:
a hydraulic pressure source including at least one hydraulic pump capable of providing pressurized fluid as an output;
a hydraulic motor in fluid communication with the hydraulic pressure source and switchable between a first displacement arrangement and a second displacement arrangement, the first displacement arrangement having a larger displacement than the second displacement arrangement;
a drive control valve operably coupled to the hydraulic pressure source and configured to provide pressurized fluid from the hydraulic pressure source to the hydraulic motor to cause the hydraulic motor to rotate; and
a shift valve configured to selectively provide pressurized fluid from the hydraulic pressure source as a shift signal to the hydraulic motor for selecting one of the first displacement arrangement and the second displacement arrangement, the shift valve configured to select one of the first and second displacement arrangements in response to a pressure signal provided to a shift mechanism of the shift valve, wherein the shift valve is in communication with the drive control valve and wherein the drive control valve is configured to provide the pressure signal to the shift mechanism of the shift valve.

19. The drive system of claim 18, wherein the shift valve is a first shift valve and further comprising:

a second shift valve configured to selectively provide pressurized fluid from the hydraulic pressure source to the first shift valve.

\* \* \* \* \*